United States Patent
Blanke et al.

(10) Patent No.: US 11,425,351 B2
(45) Date of Patent: Aug. 23, 2022

(54) METHOD AND SYSTEM FOR CREATING AN OUT-OF-BODY EXPERIENCE

(71) Applicant: ECOLE POLYTECHNIQUE FEDERALE DE LAUSANNE (EPFL), Lausanne (CH)

(72) Inventors: Olaf Blanke, Nyon (CH); Giulio Rognini, Geneva (CH); Simone Gallo, Arzier-le Muids (CH); Florian Lance, Cessy (FR); Bruno Herbelin, Ferney Voltaire (FR)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 0 days.

(21) Appl. No.: 17/288,598

(22) PCT Filed: Nov. 5, 2018

(86) PCT No.: PCT/IB2018/058668
§ 371 (c)(1),
(2) Date: Apr. 26, 2021

(87) PCT Pub. No.: WO2020/095088
PCT Pub. Date: May 14, 2020

(65) Prior Publication Data
US 2021/0400248 A1    Dec. 23, 2021

(51) Int. Cl.
*H04N 13/117* (2018.01)
*H04N 13/243* (2018.01)
(Continued)

(52) U.S. Cl.
CPC .......... *H04N 13/117* (2018.05); *G06F 3/011* (2013.01); *G06F 3/016* (2013.01); *H04N 13/243* (2018.05);
(Continued)

(58) Field of Classification Search
CPC .. H04N 13/117; H04N 13/243; H04N 13/271; G06F 3/011; G06F 3/016;
(Continued)

(56) References Cited

U.S. PATENT DOCUMENTS

| 5,987,726 A | 11/1999 | Akeel |
| 6,041,500 A | 3/2000 | Terpstra |

(Continued)

FOREIGN PATENT DOCUMENTS

WO    WO 2020044079    3/2020

OTHER PUBLICATIONS

Alvarado, C. S. (2000). Out-of-body experiences.
(Continued)

*Primary Examiner* — Fernando Alcon
(74) *Attorney, Agent, or Firm* — Andre Roland S.A.; Nikolaus Schibli

(57) ABSTRACT

A computer-implemented method for inducing an Out of Body Experience (OBE) in a user through an augmented/virtual reality (ARNR) system, the OBE including an exit state and a disembodiment state, the method comprising the steps of (a) changing the user viewpoint from body-centered viewpoint to distanced viewpoints, thereby inducing an OBE exit state, and (b) showing to the user his/her own body from the distanced viewpoints, thereby inducing an OBE disembodiment state.

24 Claims, 9 Drawing Sheets

(51) Int. Cl.
*G06F 3/01* (2006.01)
*H04S 7/00* (2006.01)
*A63F 13/5252* (2014.01)
*A63F 13/65* (2014.01)
*H04N 13/271* (2018.01)

(52) U.S. Cl.
CPC .......... *H04S 7/302* (2013.01); *A63F 13/5252* (2014.09); *A63F 13/65* (2014.09); *A63F 2300/8082* (2013.01); *H04N 13/271* (2018.05); *H04S 2400/11* (2013.01)

(58) Field of Classification Search
CPC .. G06F 3/04815; H04S 7/302; H04S 2400/11; A63F 13/5252; A63F 13/65; A63F 2300/8082; A63F 13/28
See application file for complete search history.

(56) References Cited

U.S. PATENT DOCUMENTS

| | | | |
|---|---|---|---|
| 9,703,381 | B2 | 7/2017 | Gallo et al. |
| 10,198,871 | B1* | 2/2019 | Hariton .................. A63F 13/52 |
| 10,286,555 | B2 | 5/2019 | Rognini et al. |
| 10,326,972 | B2* | 6/2019 | Zhang ..................... G06T 7/55 |
| 10,349,899 | B2 | 7/2019 | Blanke et al. |
| 10,838,515 | B1* | 11/2020 | Yitzhak .................... G06T 7/73 |
| 10,885,710 | B2* | 1/2021 | Holz ..................... H04N 13/271 |
| 2010/0169797 | A1 | 7/2010 | Lynk et al. |
| 2010/0194872 | A1* | 8/2010 | Mathe ..................... G06F 3/011 |
| | | | 348/E7.085 |
| 2010/0241998 | A1* | 9/2010 | Latta ....................... G06F 3/011 |
| | | | 715/862 |
| 2014/0160129 | A1* | 6/2014 | Sako ................. G02B 27/0172 |
| | | | 345/427 |
| 2014/0186002 | A1 | 7/2014 | Hanaya et al. |
| 2015/0253313 | A1* | 9/2015 | Hwang ............... G01N 29/036 |
| | | | 422/82.01 |
| 2016/0238040 | A1 | 8/2016 | Gallo et al. |

OTHER PUBLICATIONS

Blanke, O., Landis, T., Spinelli, L., & Seeck, M. (2004). Out-of-body experience and autoscopy of neurological origin. Brain, 127(2), 243-258.

Blanke, O., Ortigue, S., Landis, T., & Seeck, M. (2002). Stimulating illusory own-body perceptions. Nature, 419(6904), 269-270.

Brugger, P. (2002). Reflective mirrors: perspective-taking in autoscopic phenomena. Cognitive neuropsychiatry, 7(3), 179-194.

Burtt, Harold E. (1917). Tactual illusions of movement. Journal of Experimental Psychology 2 (5):371-385.

De Ridder, D., Van Laere, K., Dupont, P., Menovsky, T., & Van de Heyning, P. (2007). Visualizing out-of-body experience in the brain. New England Journal of Medicine, 357(18), 1829-1833.

Ehrsson, H. H. (2007). The experimental induction of out-of-body experiences. Science, 317(5841), 1048-1048.

International Search Report dated Jun. 7, 2019 for Application N° PCT/IB2018/058668.

Ionta, S., Heydrich, L., Lenggenhager, B., Mouthon, M., Fornari, E., Chapuis, D., . . . & Blanke, O. (2011). Multisensory mechanisms in temporo-parietal cortex support self-location and first-person perspective. Neuron, 70(2), 363-374.

Kirman, J. H. (1974). Tactile apparent movement: The effects of interstimulus onset interval and stimulus duration. Perception & Psychophysics, 15(1), 1-6.

Lenggenhager, B., Tadi, T., Metzinger, T., & Blanke, O. (2007). Video ergo sum: manipulating bodily self-consciousness. Science, 317(5841), 1096-1099.

Slater, M., Spanlang, B., Sanchez-Vives, M. V., & Blanke, O. (2010). First person experience of body transfer in virtual reality. PloS one, 5(5), e10564.

Waltemate, T., Gall, D., Roth, D., Botsch, M., & Latoschik, M. E. (2018). The impact of avatar personalization and immersion on virtual body ownership, presence, and emotional response. IEEE transactions on visualization and computer graphics, 24(4), 1643-1652.

Written Opinion of the ISA, dated Jun. 7, 2019 for Application N° PCT/IB2018/058668.

* cited by examiner

METHOD AND SYSTEM FOR CREATING AN OUT-OF-BODY EXPERIENCE

CROSS-REFERENCE TO RELATED APPLICATIONS

The present patent application is an United States national stage patent application of International Patent Application No. PCT/IB2018/058668 that was filed on Nov. 5, 2018, designating the United States, the entire contents of this document herewith incorporated by reference.

TECHNICAL FIELD

The present invention is directed to the field of cognitive neuroscience, robotics, and human-machine interactions, more specifically out-of-body experience (OBE), and methods, systems, and devices for applications in these fields.

BACKGROUND ART

In an out-of-body experience (OBE), people seem to be awake and feel that their "self", or center of awareness, is located outside of the physical body and somewhat elevated. It is from this elevated extra-personal location that the subjects experience seeing their body and the world. An OBE can thus be defined as the presence of the following three phenomenological elements: the feeling that the center of awareness is located outside one's physical body (or disembodiment); the experience of a distanced and elevated visuo-spatial perspective (or perspective); and the seeing of one's own body (or autoscopy) from this elevated perspective. OBEs are striking phenomena because they challenge the experienced spatial unity of self and body—or the experience of a "real me" that resides in one's body and is the subject of experience and action. OBEs have been reported to occur in about 5-10% of the general population, have been described in most of the world's cultures, and in several medical conditions.

In the past century, psychological, physiological, and parapsychological researchers have collected and analyzed cases of individuals with OBEs (Crookall 1964, Muldoon and Carrington 1970, Palmer 1979, Blackmore 1982, Irwin 1985), performed questionnaire surveys (Palmer 1979, Blackmore 1982, Irwin 1985), and investigated individuals with OBEs with behavioral and physiological methods (Blackmore 1982, Irwin 1985). Despite the importance of these different reports for the study of OBEs, the fuller understanding of OBEs has been hampered by the fact that OBEs—despite their relatively high prevalence in the general population—occur in the large majority of cases spontaneously (and thus unpredictably) and, in addition, extremely rarely in a given individual (only 1-2 times in a lifetime). Moreover, to date no accepted method has been described that is able to induce OBEs under carefully controlled experimental conditions. Although a large variety of so-called behavioral induction methods have been proposed, they lack detail, have not been tested in larger groups of subjects, and at most have been able to weakly enhance the occurrence of OBEs, and this almost entirely in highly selected groups of subjects with prior interests in OBEs (Blackmore 1982). Accordingly, there is currently no description of validated and broadly accepted induction methods that are required for a fuller understanding of OBEs.

Over the last 30 years, OBEs have been investigated in neurological patients, allowing to explore the brain mechanisms associated with OBEs (Devinsky, Feldmann et al. 1989, Brugger 2002), leading to a proposal that especially the temporo-parietal cortex of the right hemisphere is involved in OBEs (Blanke, Landis et al. 2004). In some of these investigations it was also possible to repeatedly induce OBEs in individual patients (Blanke, Ortigue et al. 2002, De Ridder, Van Laere et al. 2007). These neurological investigations were important, as they linked the study of OBEs to the field of clinical neuroscience and multisensory processing, and indicated to some of the specifically involved brain mechanisms. However, cases where OBEs were induced repeatedly are extremely rare in neurological patients. Moreover, it is not known how the brain mechanisms of disease-related OBEs compare with spontaneous OBEs occurring in the healthy population.

More recently, new technologies (especially virtual reality, VR) have been developed that have allowed to link the study of OBEs with neuroscience methods in healthy participants and also propose methods to experimentally inducing mental states that are comparable with OBEs. Importantly, such research has developed and adapted VR technology that is based on insights from previous research about the phenomenology of OBEs, and research on multisensory perception. Thus, several groups have been able to experimentally induce mental states that share several aspects with OBEs by exposing participants for prolonged periods of time to VR and multisensory stimulation (Ehrsson 2007, Lenggenhager, Tadi et al. 2007, Slater, Spanlang et al. 2010). These approaches have also been linked to brain imaging in healthy subjects (i.e. Ionta, Heydrich et al. 2011). Although these approaches using VR are important by bringing certain phenomenological aspects of OBEs under experimental control and allow to measure detailed behavior and associated brain activity, they lack in other aspects. More specifically, the following aspects of the background art have the following deficiencies:

Currently no VR system for OBEs is able to induce OBEs by applying all spatial changes in visual viewpoint within or beyond a room, change the dynamics of these spatial viewpoints, and track the person's body online, while importantly, integrating these visual viewpoint changes with congruent multisensory bodily stimulation that has been found to induce mental states comparable to OBEs.

OBEs in many people are not only characterized by a distanced visual viewpoint, but also by so-called exit phenomena (i.e., bodily and/or auditory sensations reported by people with OBEs at the moment of experiencing to leave their body) and re-entry phenomena (i.e., bodily and/or auditory sensations reported by people with OBEs at the moment of experiencing to re-enter their body at the end of the OBE) (Green 1968). In most spontaneous reports of OBEs there is an absence of a transitional period, that is, there are generally no sensations related to the transition from the feeling of being normally embodied to the OBE feeling of being disembodied and at an elevated and distanced position and perspective (this also includes the reverse transition to normal embodiment). However, it has been reported that about 30% of the people have transition phenomena (exit and re-entry phenomena) (Alvarado et al., 2000). This was mostly analyzed for exit phenomena with a third of the tested people reporting to experience explicit bodily disembodiment sensations ("exit" phenomena of leaving the body). Crucially, the absence of transitions may be associated with an absence of an explicit experience of disembodiment: there is frequently no loss of the experienced spatial unity between self and body, arguably one of the most relevant experiences during an OBE. Thus, most subjects spontaneously reporting an OBE do not mention disembodiment explicitly and "simply" find themselves at a different position and perspective than their physical body. Consequently, a person with an OBE most often states that he or she did not feel any bodily disembodiment or a bodily change before or when being in an out-of-body state. It is usually reported that there was "no transition", or that the transition was "very rapid", or that it was "like the flick of a switch". To the contrary, people that report undergoing many OBEs may have frequent (some always) exit and re-entry phenomena. Currently no system, particularly VR systems, suited for inducing OBEs is able to generate a multisensory transitional period (i.e. exit and re-entry phenomena) and a change in the point of view associated with disembodiment.

Although OBEs are characterized by three (3) key phenomenological aspects, OBE reports show a large degree of variability across subjects, such as type of tactile sensations while exiting the body, the direction of exiting and the precise spatial location and dynamics of the viewpoint, to cite a few. No system, particularly VR systems, provides a methodological solution to take this intrinsic variability into account and allow the user to personalize the provided multisensory stimulation so that the OBE experience can be maximized. Accordingly, in light of these deficiencies of the background art, strongly improved systems, devices, and methods for OBE experience of a user are desired.

SUMMARY

According to some aspects of the present invention, as described hereinafter and in the appended claims, it is possible to overcome the shortcomings and limitations of the prior approaches as described. A method and a technological multimodal system or device is described that is configured for inducing the illusion of an Out-of-Body Experience to a user, preferably including the steps of:

1) allowing a user to see his/her own body (not an avatar's body) from an elevated perspective, and to rapidly change his/her viewpoint, specifically from a body-centered viewpoint to a distanced viewpoint. Subjects may report to see their own physical body as moving, but it is mostly still during an OBE. The developed technological system proved able to show the person's body as still or as moving, and can show the person's movements in real-time when the subject's viewpoint is body-centered (normal state) and with no or with slower movements during elevated viewpoints during the disembodiment (Visual aspect);

2) providing tactile sensations to a user while visually exiting and re-entering the body (i.e. tactile stimulation associated with the change in perspective from a body-centered viewpoint to a distanced viewpoint—Tactile aspect);

3) possibly providing auditory sensations to a user while visually exiting and re-entering the body (i.e. auditory stimulation associated with tactile stimulation associated with the change in perspective from a body-centered view point to a distanced view point—Auditory aspect); and 4) preferably select the viewpoint and sensations that maximize a user's OBE (personalization).

Accordingly, it is an object of the present invention to provide for a computer-implemented method for inducing an Out of Body Experience (OBE) in a user through an augmented or virtual reality (AR/VR) system, the OBE comprising an exit state and a resting state, the method comprising the steps of:

a) changing the user viewpoint from body-centered viewpoint to distanced viewpoints, thereby inducing an OBE exit state; and b) showing to the user his/her own body and possibly real-time movements from the distanced viewpoints, thereby enhancing an OBE disembodiment state and adding the OBE element of autoscopy.

In one aspect, the OBE further comprises a re-entry state, and the method further comprises the step of:

c) changing the user viewpoint from a distanced viewpoint to a body-centered viewpoint, thereby inducing the illusion of an OBE re-entry state.

In another aspect, the method further comprises a step of providing haptic stimuli configured to reinforce the illusion of at least one of an OBE exit state, an OBE disembodiment state and an OBE re-entry state. The haptic stimuli can be provided via a haptic device operatively connected with the AR/VR system, assembled and configured as a multisensory stimulation system.

Additionally, in another aspect, the method further comprises a step of providing the user with auditory stimuli. The auditory stimuli can be provided via an audio system operatively interconnected to the haptic device and/or to the AR/VR system assembled and configured as a multisensory stimulation system.

According to another aspect of the present invention, a non-transitory computer readable medium is provided, for example but not limited to a CDROM, DVDROM, Blu-Ray™ disk, memory card, memory stick, portable storage drive, network storage drive, hard disk, FLASH disk, that has computer readable code recorded thereon, the compute readable code configured to perform one or more steps of a method for inducing an Out of Body Experience (OBE) in a user through an augmented or virtual reality (AR/VR) system, when executed on a computer of the AR/VR system.

Another object of the present invention relates to a system comprising:

a) an AR/VR system configured to capture and show video information to a user about one of a movement or a position of the user; and b) a data processing apparatus operatively connected with the AR/VR system, the apparatus comprising a processor configured to perform the method as described in the present invention.

In one aspect, the system is a multimodal system further comprising a haptic device configured to provide haptic stimuli to a user, wherein the data processing apparatus is operatively connected with the haptic device and comprises a processor configured to perform the method as described in the present invention.

In still another aspect, the system is a multimodal system further comprising an audio system configured to provide auditory stimuli to a user, wherein the data processing apparatus is operatively connected with the audio system comprises a processor configured to perform the method as described in the present invention.

The above and other objects, features and advantages of the present invention and the manner of realizing them will become more apparent, and the invention itself will best be understood from a study of the following description with reference to the attached drawings showing some preferred embodiments of the invention.

BRIEF DESCRIPTION OF THE SEVERAL VIEWS OF THE DRAWINGS

The accompanying drawings, which are incorporated herein and constitute part of this specification, illustrate the presently preferred embodiments of the invention, and together with the general description given above and the detailed description given below, serve to explain features of the invention.

Herein, identical reference numerals are used, where possible, to designate identical elements that are common to the figures. Also, the images are simplified for illustration purposes and may not be depicted to scale.

DETAILED DESCRIPTION OF THE SEVERAL EMBODIMENTS

Figure 1:
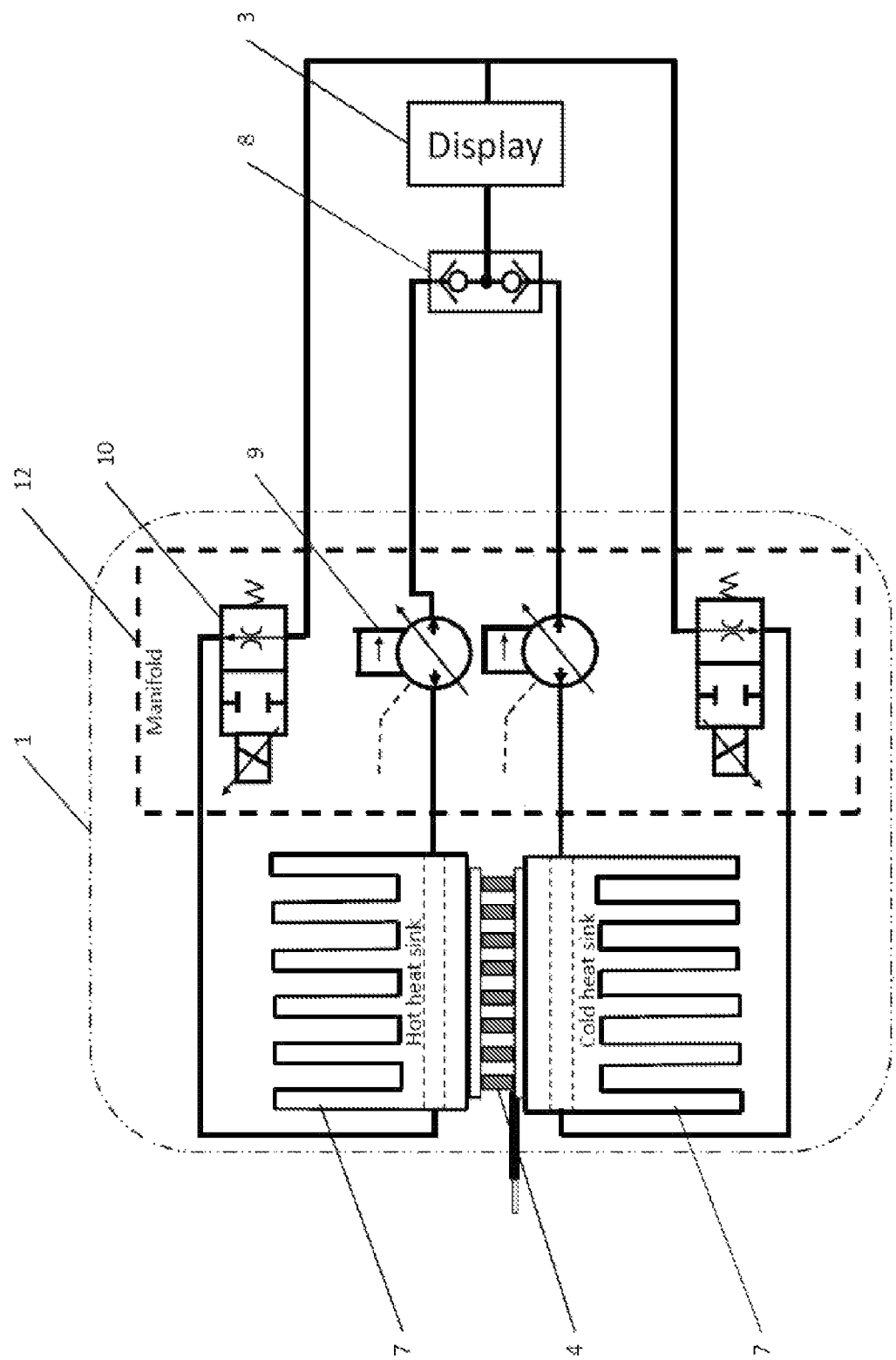
FIG. 1 shows a schematic representation of an embodiment of the haptic device included in the multimodal system according to an aspect of the invention.

The subject-matter herein described will be clarified in the following by means of the following description of those aspects which are depicted in the drawings. It is however to be understood that the subject matter described in this specification is not limited to the aspects described in the following and depicted in the drawings; to the contrary, the scope of the subject-matter herein described is defined by the claims. Moreover, it is to be understood that the specific conditions or parameters described and/or shown in the following are not limiting of the subject-matter herein described, and that the terminology used herein is for the purpose of describing particular aspects by way of example only and is not intended to be limiting.

Unless defined otherwise, technical and scientific terms used herein have the same meaning as commonly understood by one of ordinary skill in the art to which this invention belongs. Further, unless otherwise required by the context, singular terms shall include pluralities and plural terms shall include the singular. The methods and techniques of the present disclosure are generally performed according to conventional methods well known in the art and as described in various general and more specific references that are cited and discussed throughout the present specification unless otherwise indicated. Further, for the sake of clarity, the use of the term "about" is herein intended to encompass a variation of +/−10% of a given value.

The following description will be better understood by means of the following definitions.

As used in the following and in the appended claims, the singular forms "a", "an" and "the" include plural referents unless the context clearly dictates otherwise. Also, the use of "or" means "and/or" unless stated otherwise. Similarly, "comprise", "comprises", "comprising", "include", "includes" and "including" are interchangeable and not intended to be limiting. It is to be further understood that where for the description of various embodiments use is made of the term "comprising", those skilled in the art will understand that in some specific instances, an embodiment can be alternatively described using language "consisting essentially of" or "consisting of."

A "haptic device" is any device that exploits haptic technology. As used in the present disclosure, "haptic technology" or "haptics" is a feedback technology which recreates or stimulates the sense of touch by applying forces, pressures, temperatures, electrostimulations, vibrations and/or motions to the user. This mechanical stimulation can be used e.g. to assist in the creation of virtual objects in a computer simulation, to control such virtual objects, and to enhance the remote control of machines and devices (telerobotics). Haptic devices may incorporate sensors that measure forces, pressures or movements exerted by the user on the interface and vice versa.

As a research tool, haptic devices contribute to the understanding of how touch and its underlying brain functions work. A haptic device usually comprises a tactile display, a display device that presents information in tactile form (tactile feedbacks). The most common applications of the haptic technology include the provision of haptic feedbacks for controllers such as game controllers, joysticks, remote-controlled robotic tools, mobile devices such as mobile phones, virtual reality systems and so forth. Haptic interfaces for medical simulation may prove especially useful for e g training in minimally invasive procedures, as well as for performing remote surgery.

The expression "Virtual Reality" (VR) refers to an experience taking place within a simulated, artificial environment constructed by a computer, that incorporates mainly auditory and visual, but also other types of sensory feedback like haptic, and permits a user to interact with that environment as if the user were actually immersed in the environment. The object of a "virtual reality system" is to give users the ability to explore environments that exist only as models in the memory of a computer. This immersive environment can be similar to, or models of, the real world or it can be fantastical, creating an experience that is not possible in ordinary physical reality.

Current VR technology most commonly uses virtual reality headsets or multi-projected environments, sometimes in combination with physical environments or props, to generate realistic images, sounds and other sensations that simulate a user's physical presence in a virtual or imaginary environment. A person using virtual reality equipment is able to "look around" the artificial world, move around in it, and interact with virtual features or items. The effect is commonly created by VR headsets consisting of a head-mounted display with a small screen in front of the eyes, but can also be created through specially designed rooms with multiple large screens.

VR systems that include transmission of vibrations and other sensations to the user through a game controller or other devices are known as haptic systems. This tactile information is generally known as force feedback in medical, video gaming and military training applications.

A typical virtual reality system includes a computer, input devices, and an output device. The computer maintains the model of the virtual world and calculates its appearance from the view point of the user. The output device is often an apparatus that mounts on the user's head and may be either a display or screen mounted to a helmet or a pair of goggles. By wearing the helmet, the user visually immerses himself or herself in the virtual world. Also, attached to the helmet are tracking devices that enable the computer to know about the position of the user's head and in what direction the user is looking. The input devices found on a typical system range from simple joysticks to gloves or other body wear that may monitor a user's movements and gestures.

Augmented reality systems may be considered a form of VR that layers virtual information over a live camera feed into a headset or through a smartphone or tablet device giving the user the ability to view three-dimensional images. "Augmented Reality" (AR), also known as "mixed reality", is an interactive experience of a real-world environment whereby the objects that reside in the real-world are "augmented" by computer-generated perceptual information, sometimes across multiple sensory modalities, including visual, auditory, haptic, somatosensory, and olfactory. The overlaid sensory information can be constructive (i.e. additive to the natural environment) or destructive (i.e. masking of the natural environment) and is seamlessly interwoven with the physical world such that it is perceived as an immersive aspect of the real environment. In this way, augmented reality alters one's ongoing perception of a real world environment, whereas virtual reality completely replaces the user's real world environment with a simulated one.

The term "multimodal" refers herein to the characteristic way by which a haptic device or a multimodal system according to some aspects of the present disclosure provides a user with a feedback. In particular, a multimodal feedback allows a user to experience multiple modes of interfacing with a haptic device or a multimodal system. Multimodal interaction is the interaction with a virtual and/or a physical environment through natural modes of communication. This interaction enables a more free and natural communication, interfacing users with automated systems in both input and output. However, in the frame of the present invention, the term multimodal refers more specifically to the several modes by which devices and systems of the invention can provide multisensory and sensorimotor feedbacks to a user. The human sense of touch can be divided into two separate channels. Kinaesthetic perception refers to the sensations of positions, velocities, forces and constraints that arise from the muscles and tendons. Force-feedback devices appeal to the kinaesthetic senses by presenting computer-controlled forces to create the illusion of contact with a rigid surface. The cutaneous class of sensations arise through direct contact with the skin surface. Cutaneous stimulation can be further separated into the sensations of pressure, stretch, vibration, and temperature. Tactile devices generally appeal to the cutaneous senses by skin indentation, vibration, stretch and/or electrical stimulation. The multimodal device is construed and assembled in order to provide haptic stimuli and feedbacks involving one or more, possibly combined, among kinaesthetic or cutaneous sensations. Similarly, a multimodal system refers to a system comprising a plurality of elements that combine and coordinate one or more among visual, haptic, sound, and vestibular stimuli or motor feedbacks to be presented to a user.

Multimodal devices can offer a flexible, efficient and usable way to allow users to interact through input modalities and to receive information by the device through output modalities. The multimodal device has to recognize the inputs from the different modalities, combining them according to temporal and contextual constraints in order to allow their interpretation, interpreting the fused inputs and returning to the user outputs arranged according to a consistent feedback.

For what the above, for "kinaesthetic haptic stimulus" is herein meant a haptic stimulus provided by at least part of a haptic device or a multimodal system that alters a person's awareness or perception of the position, weight, tension and/or movement of some or all parts of his/her body. As used herein, kinaesthetic haptic stimuli include any machine/user interaction that alters the sense of equilibrium, the muscle sense (the faculty by which muscular movements are perceived), the posture sense (a variety of muscular sense by which the position or attitude of the body or its parts is perceived) and/or the space sense (the faculty by which relative positions and relations of objects in space are perceived).

A "closed-loop system", also known as a feedback control system, refers herein to a control system which uses the concept of an open loop system (in which the output has no influence or effect on the control action of the input signal) as its forward path but has one or more feedback loops (hence its name) or paths between its output and its input. The reference to "feedback" means that some portion of the output is returned back to the input to form part of the system's excitation. Closed-loop systems are usually designed to automatically achieve and maintain the desired output condition by comparing it with the actual condition. It does this by generating an "error" signal which is the difference between the output and the reference input. In other words, a closed-loop system is a fully automatic control system in which its control action is dependent on the output in some way.

As used herein, a "fluid" is a substance that continually deforms (flows) under an applied shear stress. Fluids are a subset of the phases of matter and include liquids, gases, plasmas and plastic solids. They display properties such as not resisting deformation, or resisting it only lightly and the ability to flow (also described as the ability to take on the shape of the container).

According to some aspects of the invention, the fluid comprises or consists of a gas or preferably a liquid such as e.g. water, aqueous solutions, non-polar (e.g. oil) solutions and the like. An "aqueous solution" is a solution in which the solvent is substantially made of water. In the frame of the present disclosure, the term "aqueous" means pertaining to, related to, similar to, or dissolved in water. In the frame of the present disclosure, the fluid according to the invention is also interchangeably referred to as "medium fluid" or simply "medium". A further suitable liquid to be used in accordance to the present disclosure can be a coolant aqueous solution such as for instance the TCS COOLANT™ supplied by TCS Micropumps Ltd. Such a liquid solution has further beneficial characteristics for the herein disclosed device as for example improvement of the contact at the interface between heat exchanger and coolant leading to increased thermal efficiency, inhibition or limitation of corrosion and/or algae and microbe growth, lubrication of pump seals (thus increasing pump life), reduction of air locks and so forth.

In the frame of the present disclosure, the expression "operatively connected" reflects a functional relationship between the several components of the haptic device or the entire system among them, that is, the term means that the components are correlated in a way to perform a designated function. The "designated function" can change depending on the different components involved in the connection; for instance, the designated function of a manifold operatively connected to a container is the regulation of the fluid medium flow between the container and a pipeline via the opening/closing of valves and/or activation/deactivation of a pump. Similarly, the designated function of a valve operatively connected to a display is the regulation of influx/efflux of the fluid medium through the display. A person skilled in the art would easily understand and figure out what are the designated functions of each and every component of the device or the system of the invention, as well as their correlations, on the basis of the present disclosure.

A "display unit" is a portion of the device of the invention comprising a tactile display. A "tactile display", also referred to herein as "cell display" or "tactile cell", in the frame of the present disclosure refers to an output device for presentation of information in a tactile form. A tactile display is a user—device interface that can reproduce as closely as possible the tactile parameters of an object, either real or virtual, such as shape, surface texture, roughness, temperature and so forth. Particularly, in the frame of the present invention, a tactile display is an element that can provide pressure sensations, possibly combined with temperature sensations, to a user, including pinching, via fluid inflation or filling of a portion thereof; consequently, in preferred embodiments, a tactile display does not include devices such as motors, electro-magnetic actuators, vibration generators and the like.

A "Peltier element" is a thermoelectric device that uses the Peltier effect to create a heat flux between the junction of two different types of materials. Also known as Peltier cooler, heater, or thermoelectric heat pump, it is a solid-state active heat pump which transfers heat from one side of the device to the other, with consumption of electrical energy, depending on the direction of the current. It can be used either for heating or for cooling, although in practice the main application is cooling. It can also be used as a temperature controller that either heats or cools.

An "elastic material" is a solid material having the tendency to return to its original shape after being compressed, stretched, expanded or otherwise deformed. An elastic material is particularly suitable for the manufacturing of a tactile display of the device of the invention, since it could permit, enhance or ameliorate the range of possible user's feedbacks provided by the display in terms of tactile sensations. A non-exhaustive and non-limiting list of suitable elastic materials according to the present invention comprises polymeric materials such as silicone (for example polydimethylsiloxane PDMS), nitrile rubber, latex, polyurethane, polyisoprene (synthetic rubber), any kind of elastomers, the Tango family of rubber-like materials (for example TangoPlus or FullCure930) and the like.

A multimodal haptic device or multimodal system can include one or more sensors for detecting and possibly storing at least a user's physiological parameter, an environmental parameter or a combination thereof, and is operatively connected with at least one element of the multimodal haptic device or the multimodal system. A "sensor" as used herein is a device that detects (and possibly responds to) signals, stimuli or changes in quantitative and/or qualitative features of a given system, or the environment in general, and provides a corresponding output. The output is generally a signal that is converted to human-readable display at the sensor location or transmitted electronically over a network for reading or further processing. The specific input could be for instance light, heat, motion, moisture, pressure, or any one of a great number of other environmental phenomena. According to the invention, a sensor preferably comprises a means for detecting and possibly storing user's physiological parameter, an environmental parameter or a combination thereof. For example, the sensors can include but are not limited to pulse sensors, respiratory rate sensors, respiratory volume sensors, body temperature sensors, blood pressure sensors, electrocardiogram (ECG) sensors, humidity sensors, environmental temperature sensors. The sensor can therefore comprise a data storage device to hold information, process information, or both. Common used data storage devices include memory cards, disk drives, ROM cartridges, volatile and non-volatile RAMs, optical discs, hard disk drives, flash memories and the like. The information detected and collected by sensors can relate to a user's physiological parameter such as for instance muscle contraction (including postural muscle contraction), heart work rate, skin conductance (also called galvanic skin response GSR), respiratory rate, respiratory volume, body temperature, blood pressure, blood level of organic/inorganic compounds (e.g. glucose, electrolytes, amino acids, proteins, lipids etc.), electroencephalogram, sweating and so forth. Alternatively or additionally, the information detected and collected by the sensor can relate to environmental parameters such as temperature, humidity, light, sounds and the like, including user/environment parameters such as user position or movement.

Preferably, sensors further comprise a data transmission device for transmitting the detected and possibly stored data concerning the above-mentioned parameters to a computer, and more preferably through a wireless connection. "Wireless" refers herein to the transfer of information signals between two or more devices that are not connected by an electrical conductor, that is, without using wires. Some common devices for wirelessly transferring signals includes, without limitations, telecommunication devices that are based on WiFi, Bluetooth, magnetic, radio, telemetric, infrared, optical, ultrasonic connection and data transmission, and the like.

In one aspect, sensors further comprise a device for wirelessly receiving a feedback input from a computer able to regulate the functioning of the device. In one aspect, sensors are operatively connected to a display unit and/or to a manifold. The main actuation unit controls the cells in the device without any cable (depending on the configuration, but at least in a configuration where the valves are on a main manifold). The main actuation unit could feature a printed circuit board (PCB) with e.g. a microcontroller controlling all the components (i.e. pumps, valves, sensors and any other component mounted on a main manifold). For this reason, the board manages the low-level functions such as a closed feedback loop controlling the pressure and possibly temperature in the cells. The board can be seen as a driver for the device communicating wirelessly with a computer or a mobile phone managing high-level functions.

For "computer-readable data carrier" or "computer-readable medium" is herein meant any available medium that can be accessed by a processor and may include both a volatile and non-volatile medium, a removable and non-removable medium, a communication medium, and a storage medium. A communication medium may include computer readable instructions, data structures, program modules or other data in a modulated data signal such as a carrier wave or other transport mechanism, and may include any other form of an information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

Figure 4:
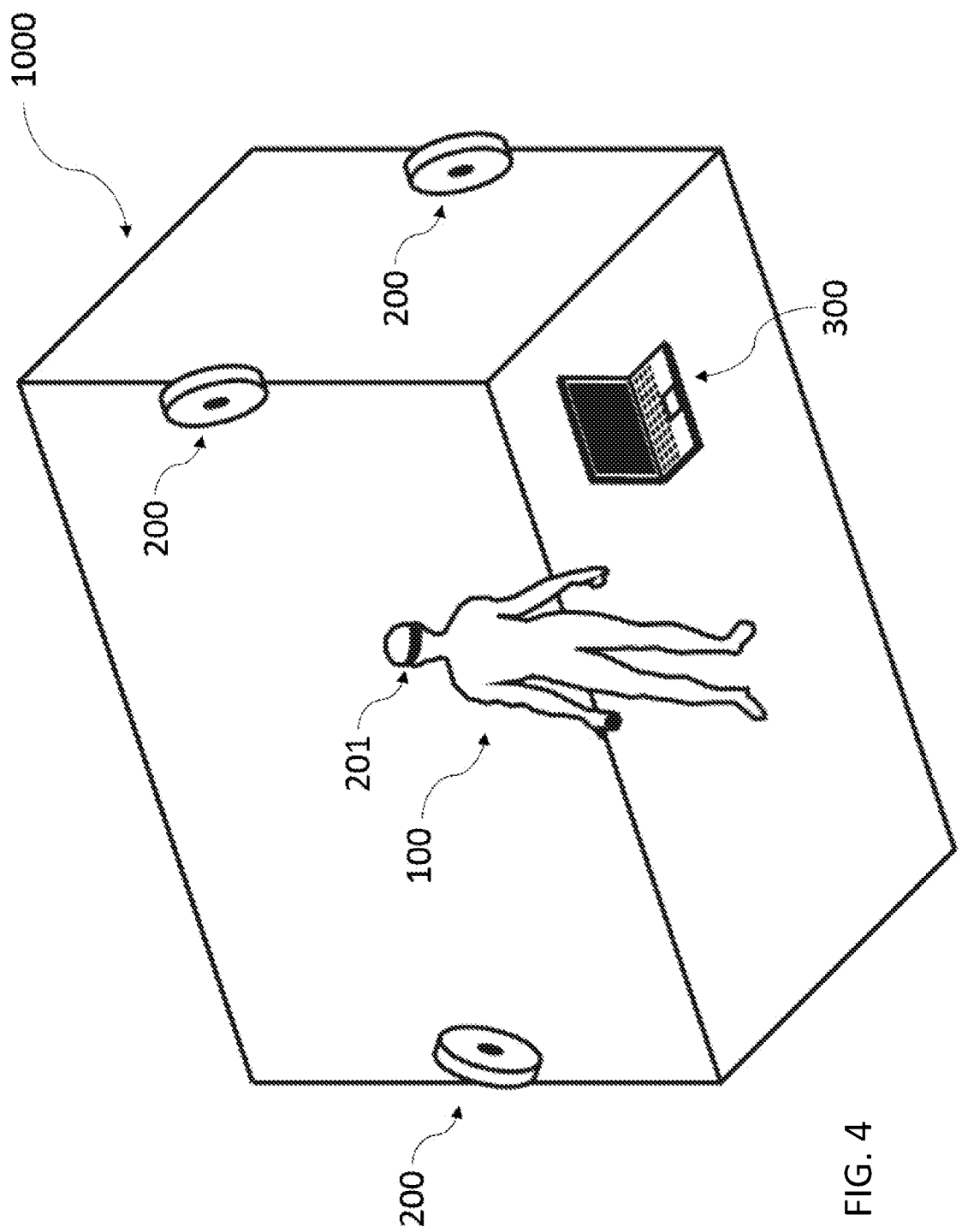
FIG. 4 shows an exemplary system according to a first embodiment of the invention.
Figure 5:
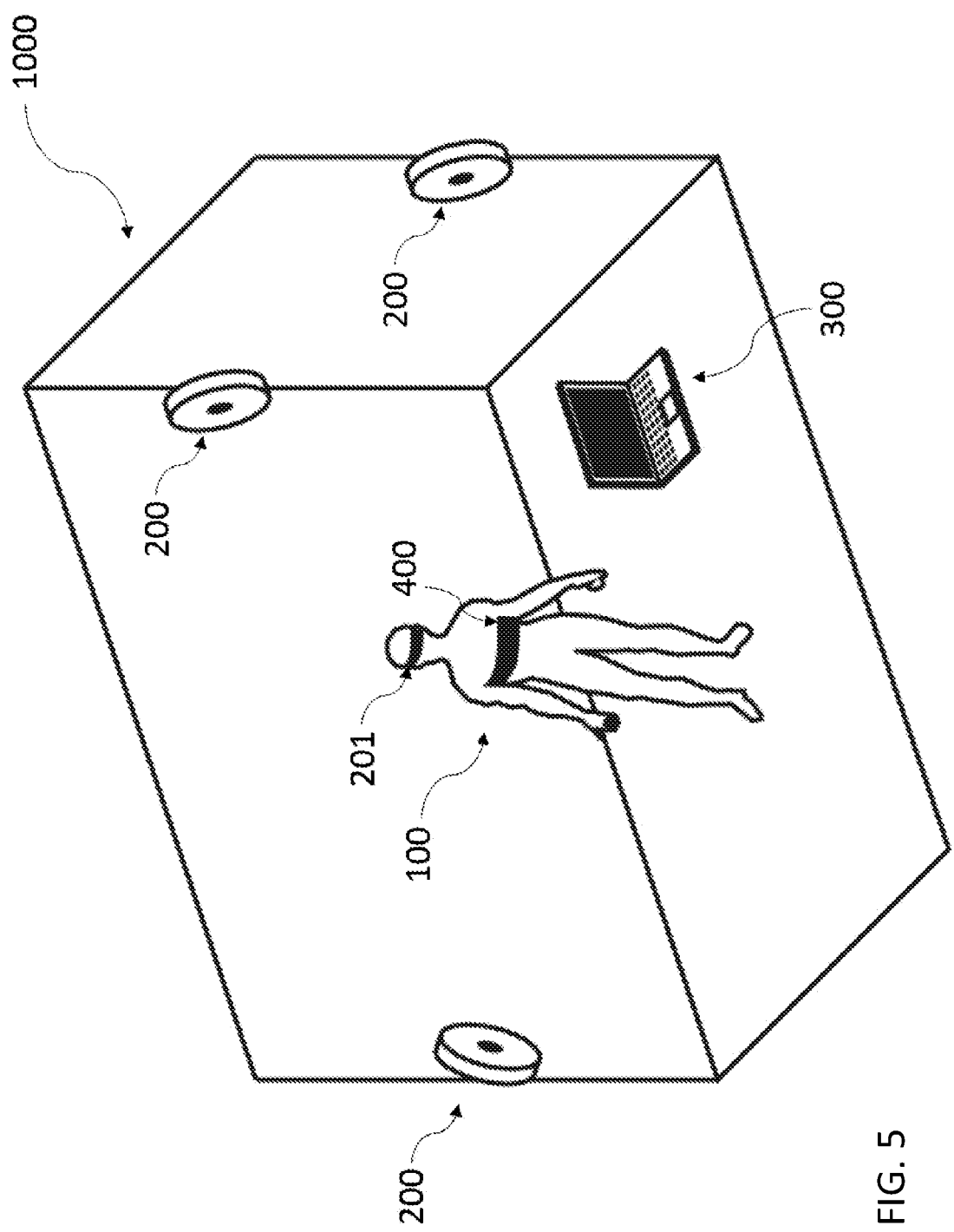
FIG. 5 shows an exemplary system according to a second embodiment of the invention.
Figure 6:
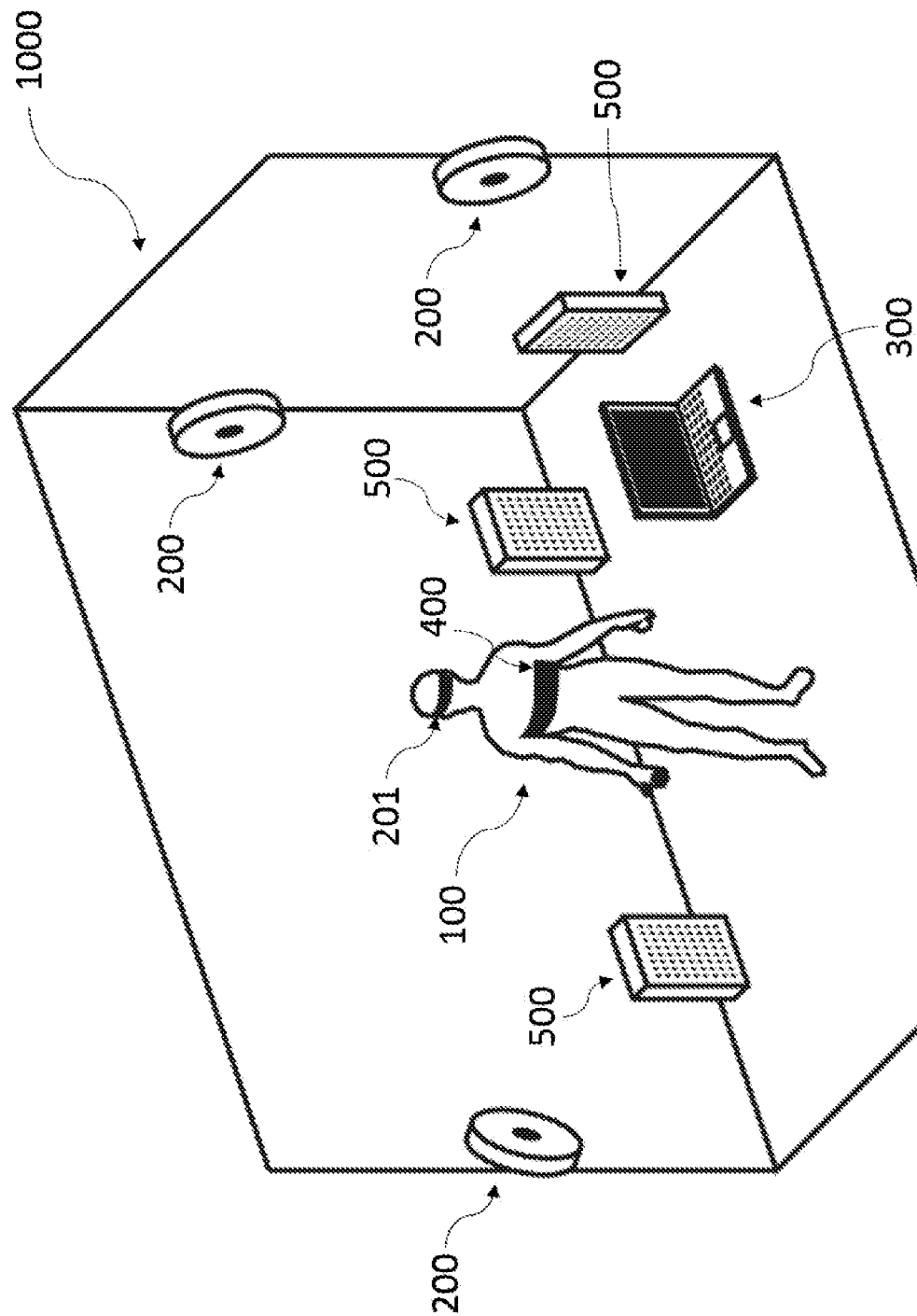
FIG. 6 shows an exemplary system according to a third embodiment of the invention.

With reference to FIGS. 4 to 6, some aspects of the present invention feature a computer-implemented method for inducing an Out of Body Experience (OBE) in a user 100 through an augmented/virtual reality (AR/VR) system 200, the OBE comprising an exit state and a disembodiment state, the method comprising the steps of:

a) changing the user 100 viewpoint from body-centered viewpoint to distanced viewpoints, thereby inducing an OBE exit state; and b) showing to the user 100 his/her own body and possibly real-time movements from the distanced viewpoints, thereby inducing an OBE disembodiment state.

In one embodiment, the OBE further comprises a re-entry state, and the method further comprises the step of:

c) changing the user 100 viewpoint from a distanced viewpoint to a body centered viewpoint, thereby inducing an OBE re-entry state.

The induction of an OBE in a subject, or at least one of an OBE exit state, an OBE disembodiment state and an OBE re-entry state, can be reinforced by providing haptic and/or auditory stimuli to the user, as will be detailed later on. The haptic stimuli can be provided via a haptic device 400 operatively connected with the AR/VR system 200 in a multimodal system, and possibly in a spatio-temporal pattern of haptic stimulation on a user's body. Auditory stimuli can be provided via an audio system 500 operatively interconnected to the haptic device 400 and/or to the AR/VR system 200 in a multimodal system, and possibly by activating the audio system 500 according to an auditory spatio-temporal pattern, and/or according to a spatio-temporal pattern of haptic stimulation.

Another object of the present invention relates to a system able to re-create all the main aspects of an OBE with actual disembodiment, in some aspects based on integrated visual-tactile-auditory stimulation. In its simplest configuration, the system comprises:

a) An augmented/virtual reality system 200 configured to capture and show video information to a user 100 about one of a movement or a position of the user 100; and b) a data processing apparatus 300 operatively connected with the augmented or virtual reality system 200, the apparatus 300 comprising a processor configured to perform the method as herein described.

In several aspects, the system can further comprise:

c) a haptic device 400 configured to provide haptic stimuli to a user 100 and/or d) an audio system 500 configured to provide auditory stimuli to a user 100 wherein the data processing apparatus 300 is operatively connected with the devices and the VR/AR system 200 in a multimodal system, the processor being configured to perform the method, according to some aspects of the present invention.

The VR/AR system 200 can comprise a body scanning system, which might include a plurality of live-recording cameras. The haptic device 400 can comprise a device for providing a kinaesthetic haptic stimulus, and in some aspects also comprises a plurality of tactile displays, possibly pneumatically or hydraulically operated, generally configured to provide one of a force, a pressure, a vibration and a temperature change haptic stimulus.

An OBE is typically considered an illusory own body perception, which spontaneously happens in both healthy subjects and in clinical populations; an OBE according to the present disclosure is an illusion, and particularly an illusion voluntarily and rationally induced. An "illusion" is a distortion of a sensorial perception, caused by the way the brain normally organizes and interprets the received information. Unlike a hallucination, which is a distortion in the absence of an apparent stimulus, an illusion describes a misinterpretation of a true sensation (in this case of the user's multimodal own body stimuli), i.e. due to different stimuli. Accordingly, the present inventors proved able to induce specific altered states of bodily consciousness by manipulating visual and sensorimotor own body inputs through a custom-made multimodal system that allows to apply a large range of well-controlled bodily stimulations.

The system features an AR/VR system 200 configured to capture and show video information to a user 100 about one of a movement or a position of the user 100. The developed VR/AR system allows users to: 1) see a 3D reconstruction of their own body (not an avatar's body) from a distanced viewpoint, 2) change from a body-centered viewpoint to distanced viewpoints, and 3) see their bodily movements and/or altered viewpoints, possibly in real-time, during body-centered viewpoints and seeing no movements or altered movements during distanced viewpoints. Current AR/VR solutions for inducing an OBE used either 1) fixed camera positions (Lenggenhager et al., 2007; Ehrsson et al., 2007) where the user's body is shown (as experienced in an OBE), but where it is impossible to switch from a body-centered viewpoint to many or all possible distanced viewpoints) or 2) an avatar's body (Slater et al., 2010), where it is possible to switch from body-centered viewpoints to distanced viewpoints (as it is possible to create all the possible views of the avatar's body), but what is seen it is not the participant's body, as experienced in an OBE. From a technological stand point, solutions in the first category (1) requires only camera recording's the user own body, whereas solutions in the second category (2) requires full body tracking technology to map the user's movement into an avatar. In order to overcome these limitations, according to some aspects of the present invention, the system and the method introduces the use of a body scanning technology which makes it possible to show the user's own 3D reconstructed body from several viewpoints.

Accordingly, in a preferred aspect of the invention, the VR/AR system 200 comprises a body scanning system (BS). A body scanner is a device able to visually capture and digitize the participant's physical body into a spherical image or video. 3D BS system allows dynamic rendering of the body of the user or participant 100 in virtual or augmented reality scenarios. In an exemplary aspect shown e.g. in FIG. 4, the scanning system comprises at least one and preferably a plurality (e.g. between 2 and 20, with three shown in FIG. 4) of fixed or moving live recording cameras, such as depth cameras, assembled in a room 1000 to cover the entire sphere of perception around a viewpoint (360° horizontally and vertically, stereoscopic vision). The cameras simultaneously capture depth information and live video of the participants' body to output a fully three-dimensional visual reconstruction of a user's body, such as an all-round holographic 3D image. Suitable cameras of this kind are for instance the Kinect v2 cameras from Microsoft (IR camera resolution 512×424 pixels, RGB camera resolution 1920×1080 pixels, Field of view 70×60 degrees, 30 Hz, Operative measuring range from 0.5 to 4.5 m). In a variant, the body scanning system BS can also include other types of sensors, for example but not limited to time-of-flight cameras, stereo view cameras, triangulation measurements and scanners.

Figure 8A:
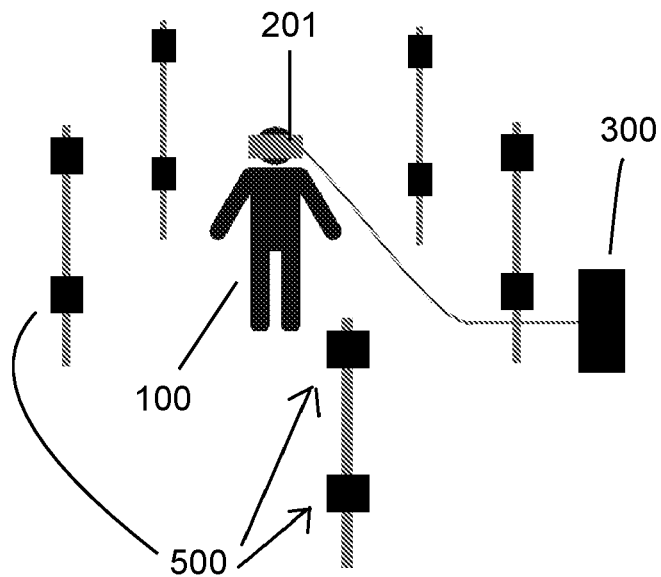
FIGS. 8A to 8D schematically and exemplarily shows the changes in view points to the user during the performance of the method for creating the out-of-body experience, according to yet another aspect of the present invention.
Figure 8B:
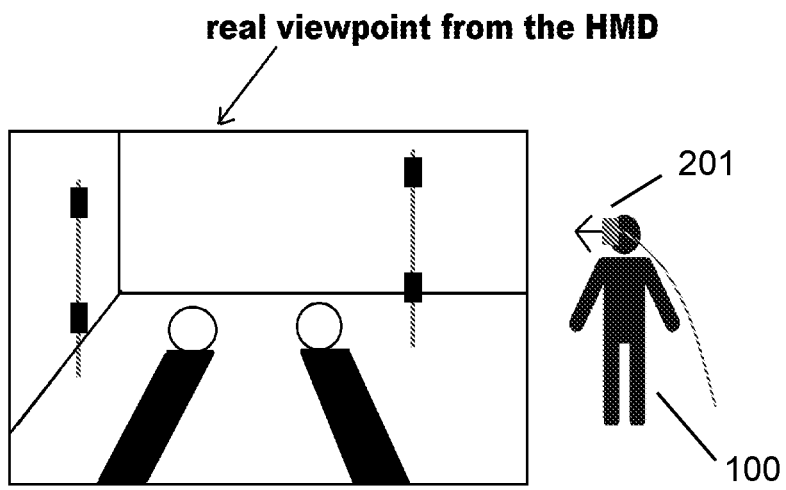
Figure 8C:
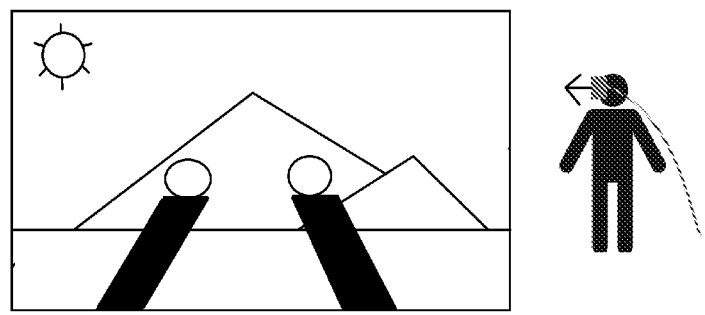
Figure 8D:
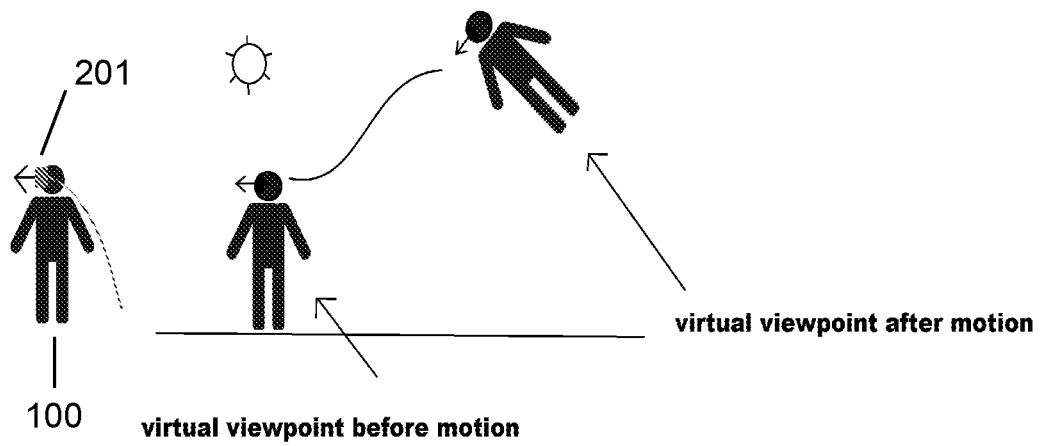

Through customized software the captured information is integrated in a VR scenario and used to present to the participants a highly realistic 3D visualization in real time of their body integrated in a VR scene. Visual stimuli are preferably presented to the participants using a head-mounted display (HMD) 201. Suitable HMD 201 of this kind are for instance the Oculus Rift CV1, having the technical data of 1080×1200 pixels per eye, 110 deg FOV, 90 Hz refresh rate, positional tracking, integrated audio. In one embodiment, the 3D reconstruction of one's own body can be pre-recorded with multiple cameras simultaneously, through different takes of a mobile camera, e.g. the camera of a mobile phone, or through a 360° spherical camera During an OBE, the viewpoint of the user or participant gradually moves away from their virtual body, shifting from a body-centered to a distanced viewpoint by moving the virtual camera along a parametrized trajectory, as exemplarily shown in FIG. 8D. As typically reported during spontaneous OBEs, participants can then observe their own "reconstructed" body from e.g. an elevated and disembodied perspective. Advantageously, through video processing algorithms, in some embodiments the user can see real time movements of his/her real body parts such as hands, arms and/or legs during an OBE exit, disembodiment and/or re-entry state, while at the same time being able to see his/her reconstructed body either in a "frozen" position or executing movements.

In one aspect, the system further includes a haptic device 400 configured to provide haptic stimuli to a user. The haptic device 400 is operatively connected to the AR/VR 200 to induce tactile sensations similar to those reported during exit and re-entry phenomena. Up to the inventors' knowledge, no current system uses haptic feedback to re-create exiting and re-entry perceptions. In one aspect, the haptic device includes a device for providing a kinaesthetic haptic stimulus.

As a way of example shown in FIG. 5 or 6, according to an aspect of the invention, the haptic device 400 comprises a custom-built wearable vibrotactile interface. This vibrotactile interface comprises one or more elastic belts attached to a user 100, such as around the user's trunk, at different heights along the user's body. Each belt contains a plurality of vibrators (e.g. four DC motors with an eccentric rotating mass), which can be located e.g. two on the front (left and right) and two on the back of the user (left and right), for a total of e.g. 12 vibrators. Activation of the vibrotactile interface provides vibrations on the participants' trunk that recreate the vibrational state that is sometimes reported prior to a spontaneous OBE. Furthermore, in some aspects, the method of the invention foresees providing haptic stimuli by activating the haptic device 400 according to a spatiotemporal pattern of haptic stimulation on a user's body. For instance, in one aspect, the "Tactile Apparent Movement" illusion (Burn 1917, Kirman 1974) is employed in concomitance to the OBE onset to enhance the experience of the "self" as if moving away from the body and back towards the body. The "apparent movement" illusion consists into activating a series of vibrators according to a specific spatio-temporal pattern in order to generate the illusion that the vibration itself is continuously moving from one vibrator to the next. To do that, the vibrators are activated sequentially and so that the stimulations of two consecutive vibrators overlap for a determined amount of time. This activation pattern is described by the following equations (1) and (2):

$$SOA = Op \times DoS \quad (1)$$

$$t_{apm} = (n-1) \times SOA + DoS \quad (2)$$

wherein DoS is the duration of the stimulation of the vibrators, SOA their stimulus-onset asynchrony, tapm the total duration of the apparent movement, Op the ratio of overlap between vibrators, and n the number of vibrators.

The tactile apparent movement is highly influenced by the tactile acuity of the skin as well as its spatial summation property, thus the parameters need to be changed according to the location of the body being stimulated. By varying the Op parameter, it is possible to calibrate and optimize the tactile apparent movement illusion for different users and for different orientations (horizontal, vertical, diagonal), locations (lower back, upper back) and durations of the apparent movements. Typical apparent movements that can be used include vertical movement up along the torso when leaving the body, downward movements when re-entering, but also horizontal movements around the torso and diagonal movements (e.g. from the left of lower back to the right of the upper back) depending of the orientation of the user at the OBE onset.

According to one aspect, the haptic device can include the one described in U.S. Pat. No. 9,703,381, this reference herewith incorporated by reference in its entirety. This kind of haptic device is particularly suitable for some of the target applications of the multimodal system of the invention, as will be detailed later on. Particularly, the haptic device comprises a plurality of tactile displays configured to provide haptic stimuli to a use. In this aspect, the haptic device is flexible and adaptable to the user's anatomy, and can even, in one aspect, provide thermo-tactile haptic feedbacks. Generally, the device comprises at least an actuation unit connected to a flexible display unit. The actuation unit pneumatically and/or hydraulically controls the pressure and possibly temperature of a fluid medium, such as liquid or a gas, to provide tactile, and possibly at the same time even temperature, cues, to the user touching the display. The tactile cues are created by controlling the shape of a flexible membrane of the display through the fluid medium pressure. In one aspect, contrary to known tactile displays that make use of several rigid actuators in order to obtain a multimodal feedback, a haptic device features one single actuation system that generates the integrity of the multiple haptic feedbacks, both tactile and proprioceptive (e.g. thermal cues).

In one aspect, thermal cues are provided by the heat exchange between the fluid medium and the user's skin through the same membrane. The temperature of the fluid medium stream flowing in the display is achieved by mixing several fluid streams at specific temperatures. These fluids are heated or cooled to specific temperatures using e.g. Peltier elements, and can be stored in buffer tanks. The medium flow and pressure are controlled using a combination of micro pumps and valves. The flexible display is composed of an array of cells herein named tactile displays or cells. The number of cells and their disposition is modular in order to adapt the cell density to the type and surface of skin. In one aspect, the medium pressure and temperature can be controlled in each individual display cell using a system of valves and manifolds, possibly embeddable in a portable actuation unit. The tactile display can have different functional shapes adapted to the user's anatomy.

Figure 3:
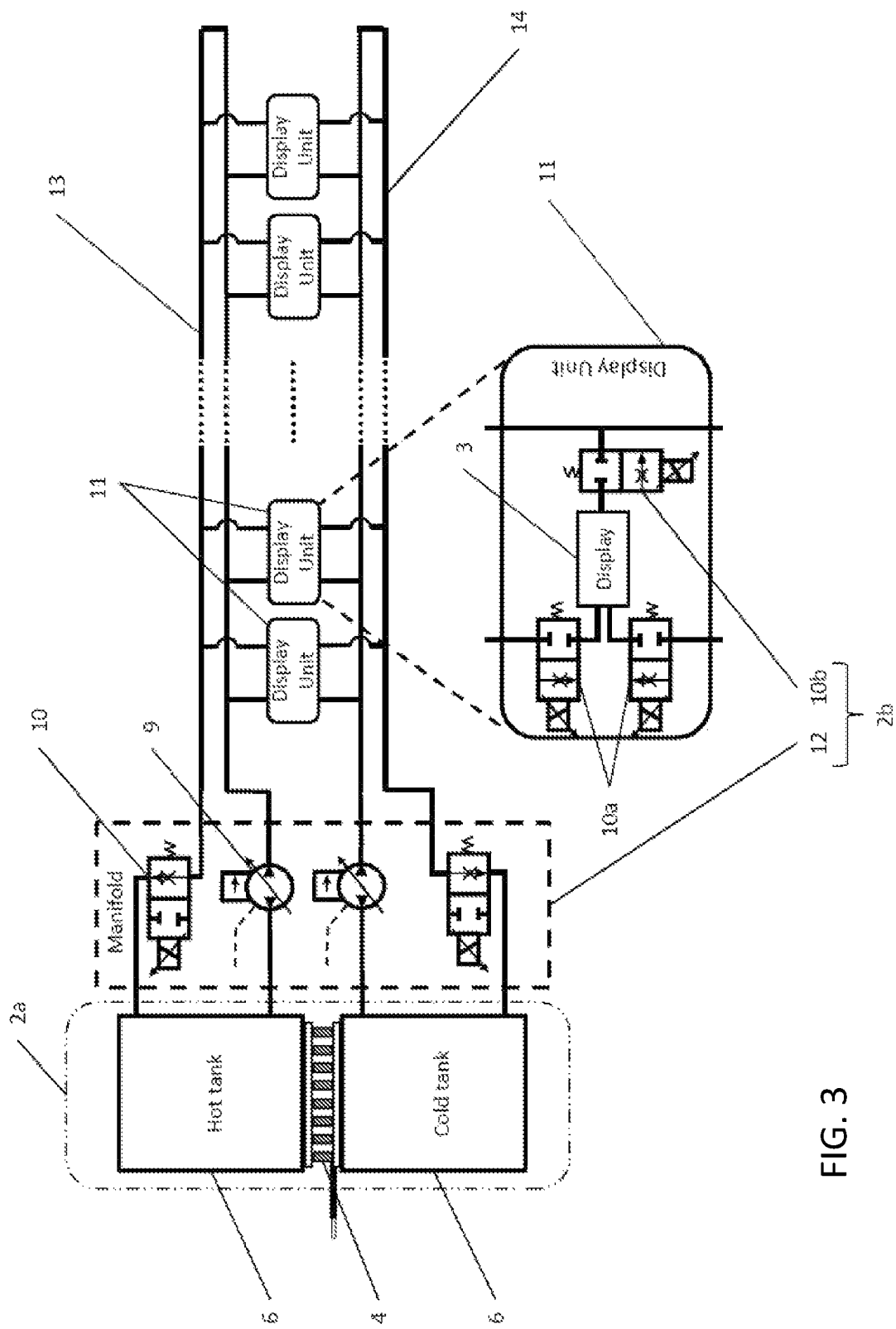
FIG. 3 shows a schematic view of another embodiment of the haptic device comprised in the multimodal system according to still another aspect of the invention.

With reference to FIGS. 1 and 3, in one aspect the device is divided in two parts: an actuation unit 1 comprising a pressure regulation unit 2b, and the display 3. In an additional aspect, the actuation unit 1 further comprises a thermal conditioning unit 2a. The pressure regulation unit 2b controls the pressure of the medium flowing through the display 3 (for each unit) working as an interface with the user's skin. A thermo-tactile feedback is achieved by using the actuation unit 1 to control the temperature of one or several fluid medium streams.

The thermal conditioning unit 2a uses one or several Peltier element(s) 4 to contemporaneously heat the fluid medium (liquid or gas) flowing on one surface while simultaneously cooling the medium flowing on its opposite surface. By doing so, the efficiency of the Peltier elements 4 is greatly increased compared to conventional applications when only one side of the Peltier elements 4 is used for thermal stimulation, while the other is forced to a constant temperature thus wasting power. Several Peltier elements 4 can be used in series to, in turn, cool down or warm up two fluid medium streams. In one embodiment, they can also be used in parallel thus creating several medium streams at different temperatures. The temperature of the fluid medium entering the display 3 is achieved by mixing streams of the medium at different temperatures. The temperature range of the device is set by the coldest and warmest stream.

In one aspect, tanks 6 can be used to store the medium at different temperatures. These temperatures delimit the thermal working span of the device and are customizable. Tanks 6 work also as buffers compensating for the change in temperature resulting from the medium returning from the display 3.

The heat transfer between the Peltier element(s) 4 and the fluid medium is achieved through heat conduction and natural or forced convection. Furthermore, heat sinks 7 (typically made of copper and aluminum) can be used to increase heat exchange. Accordingly, in one aspect of the invention, the Peltier element(s) 4 can be interposed in between two tanks, thus heating and cooling the medium in both tanks through natural convection. In this configuration, the medium in the tanks can also be set into motion using a mixing system, thus achieving forced convection.

In another aspect, the Peltier element(s) 4 can be interposed in between two heat sinks and the medium pumped through the heat sinks to achieve forced convection.

In one aspect, the fluid medium is pumped through the heat sinks 7 and the heat transferred from the Peltier element(s) 4 is sufficient to rapidly reach the target medium temperature, both on the hot and cold side. In this configuration no tanks 6 are required (instantaneous heating and cooling).

The desired display 3 temperature is achieved by mixing various medium streams at different temperatures into a mixing chamber 8. However, in an alternative aspect, this mixing can also take place directly inside the display 3. The temperature of the mixed fluid medium is regulated by controlling the proportions of hot and cold medium injected into the chamber of the display unit 3 using the pumps 9, the opening of the valves 10 or a combination of both. The temperature feedback is provided using temperature sensors in the display. Small sensors with low thermal inertia such as thermocouples, thermistors, thermal resistances and the like are introduced inside the display through the pipelines.

The pressure regulation unit 2b can control the pressure in the display by using two components: the pump(s) to generate pressure and the valve(s), called outlet valves 10, placed at the outflow of the display(s) 3 to control the medium flow. By controlling the pressure applied by the pumps 9 and/or the valve 10 a precise control of the pressure in the display 3 is achieved. Pressure sensors can be placed after the inlet valves to provide pressure feedback at the display(s).

In a preferred aspect, the entire system is completely filled with a medium, sealed and air-tight. By doing so, when a pump, for example the pump in the hot tank in a configuration with two tanks, takes medium out of a tank, the tank pressure drops. After the medium goes through the system and out of the display 3, it will be forced to return to the hot tank due to the pressure difference. If cold and hot medium is pumped from both tanks but in different proportions, for example a larger volume of hot medium than cold medium is pumped as the desired display temperature is rising, the mixed medium exiting the display will be divided between the two tanks according to the same proportions due to the different pressure drops in the two tanks. Thus, by sealing the system it is ensured that both tanks remain full at all times, and in any position. In addition, by having the same proportions of medium returning to the corresponding tanks, the impact of the returning mixed medium on the tanks thermal equilibrium will be minimal, thus reducing the power consumption of the system.

FIG. 1 shows a schematic representation of an embodiment of this system combining two previous aspects. In this system, no tanks 6 are used and the medium goes through a hot and cold heat sink sandwiching a Peltier element 4. The power of the Peltier element 4 is sufficient to bring the medium to the desired temperature almost instantaneously. The two medium streams are then mixed in the mixing chamber 8 connected to the display 3. The medium leaving the display consequently goes back to the appropriate tanks through two valves 10 mounted on the main manifold 12 (itself mounted on the tanks 6) and that are used to control the pressure in the display 3.

In a preferred aspect, a display 3 consists of a main body 16 comprising in it one or several hollow chambers 17. This body can be made of rigid material (plastic, metal, etc.) or of a flexible polymeric material (e.g. PDMS). A thin elastic membrane 18 is attached on the main body 16, covering the hollow chamber(s) 17. The membrane 18 can be made out of any kind of soft and stretchable polymer, such as a silicones or elastomeric materials. The material and thickness of the membrane 18 is selected based on the quantity of heat to be transferred and the desired elasticity, in order to obtain a convenient deformation of the membrane. The combination of a display hollow chamber 17 with the membrane 18 covering it is called a display cell 19.

Figure 2:
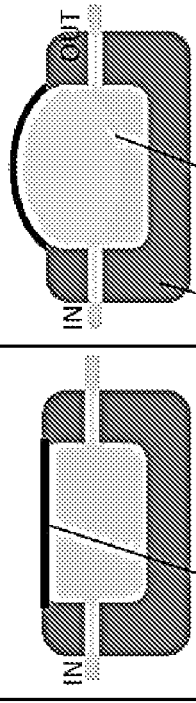
FIG. 2 presents a schematic sketch of two display types (one with a single display cell and another with multiple cells), in the inflated and resting states, of an embodiment of the haptic device comprised in the multimodal system according to another aspect of the invention.

FIG. 2 presents a schematic sketch of two display types 3 (one with a single display cell 19, the other with multiple cells 19), in the pressured and resting states. The display cells 19 size can vary depending on the tactile resolution of the skin stimulated (i.e. feet, glutei or back) and the desired type of stimulus. When the fluid medium flows through the chamber, heat exchange will occur between the user's skin touching the membrane 18 and the medium. By building up the pressure inside the display cell 19, the membrane 18 will fill or inflate, thus providing a tactile feedback.

FIG. 3 shows a schematic view of one aspect of the device. It features two tanks 6, one comprising a cold fluid medium and one comprising a hot fluid medium, with a Peltier element 4 interlaid between both tanks 6. A main manifold 12 comprising two pumps 9 and two valves 10 are mounted on the tanks 6. The two pumps 9 move the medium from the hot and cold tank into two pipes respectively leaving the manifold 12. These two pipes, named the hot main line 13 and cold main line 14, bring the hot and cold medium close to the area(s) that need(s) to be stimulated. The mediums from the hot and cold lines 13, 14 then flow back to the hot and cold tanks 6 through the manifold valves. These flows in and out of the tanks 6 generate movement of the medium in the tanks 6 and thus forced heat convection between the Peltier element 4 and the medium 5, thus increasing the efficiency of the system. By storing hot and cold medium 5 in tanks 6 and mixing them to obtain the desired temperature at the display 3, extremely high rates of temperature change can be achieved.

Display units 3 can be attached anywhere along the cold and hot lines 13, 14. A display unit 11 consists in a display 3 and three valves 10 (solenoid or proportional). The display unit 11 unit has two inputs, from the hot and cold line respectively. Two inlet valves 10*a* are used to control the amount of the hot and cold medium entering the display. The mixing of the two medium takes place directly in the display unit 3. Finally, the outlet valve 10*b* is used to control the pressure inside the chamber 17 as previously explained. When the temperature and the pressure in the display cell correspond to the desired level both the inlet and outlet valves are closed, thus isolating the display unit from the hot and cold main lines.

The cell resolution of this display is scalable to any size and density. As will be apparent for a person skilled in the art, the same actuation unit will control any shape of display, and the display shape can be easily adapted to the function.

The placement of the valves 10 is flexible and can be changed depending on the application. In another aspect of the device, the inlet valves 10*a* are placed next to their display 3, but the outlet valve 10*b* is placed in the main manifold over the tanks. This is a hybrid embodiment combining two previous designs. Thus, depending on the application and the complexity of the stimulation to be performed, the system can be centralized in one main actuation unit or decentralized over several light manifold placed at the area(s) of interest.

In another aspect of the device four pumps are used instead of two. There are two pumps per tank, one is placed upstream, the other downstream. The pump downstream must be a self-priming pump. By doing so, a precise control of the pressure in the display during medium flow is achieved. In fact, with only one pump pushing, the pressure in the display during the flowing phase is dependent on the hydraulic load following the display while with one pump pushing and the other sucking the pressure in the display during the flowing phase is controllable.

In one aspect of this invention, the display cells, the sensors, the valves, the pumps and the piping are combined into one flexible polymer "skin". This is done by molding polymers such as polydimethylsiloxane (PDMS) or by 3D printing the display using rapid prototyping machines with flexible materials (i.e. Tango Black Plus). Using these production methods the display can be fabricated with functional shapes and also easily embedded into articles of manufacture such as mats, pillows, pieces of furniture, chairs or deck-chairs, as well as into a wearable device or garments. Printed electronics using functional inks could be used to integrate the sensing directly in the membrane of the cells. For the temperature sensing, a thermocouple is created by printing two lines of different semiconductors that overlay each other in one point. This thermocouple is ideally placed because it is in contact with the skin. It is flexible and does not get damaged by bending the device. Further, in addition to the sensors, the wires going from the control/actuation unit to the display(s) can be printed, thus removing free wires from the system. Deformation sensors can be produced by printing strain gauges on the edges of the display membrane. Finally, the valves and/or the pumps can even be microvalves and micropumps, and can be molded or printed as part of this "skin". Those elements can be substantially made of an elastic polymeric material, possibly manufactured through microfluidic manufacturing techniques (e.g. photolithography, polymers molding techniques and the like).

The present device provides multiple tactile feedbacks as well as force feedback that can be displayed individually or simultaneously:

1) The pressure control system is used to control the stiffness of the display membrane. By building up pressure, the display becomes stiffer and vice versa. A dynamic control of the pressure can be also provided, in order to create e.g. a pulse feedback. This is done by building up the pressure in the chamber, thus inflating the membrane, and subsequently releasing the pressure.

2) In an additional or alternative aspect of the invention, by driving the pumps in the opposite direction while keeping the outlet valves 10*b* closed, suction at the level of the display membrane is generated, thus providing a suction feedback.

3) In an additional or alternative aspect of the invention, by using a main body 16 with lower rigidity, it is possible to combine the orthogonal deformation of the membrane with a tangential deformation of the main body. This will provide an additional tactile feedback, i.e. a lateral skin stretch.

4) In an additional or alternative aspect of the invention, the membrane has a high porosity. This in turn increases the humidity under the user's skin. By applying pressure, or suction, it is possible to control the humidity, thus providing humidity feedback.

5) In an additional or alternative aspect of the invention, the display has a high density of small tactile cells used to generate a texture under the user's skin. In a passive version, the user's skin is moving on the display and the user can feel the edges due to the inflated cells. In the active version, the user's skin is immobile on the display and the cells are activated in specific spatiotemporal patterns giving the illusion of stroking a specific texture.

6) In an additional or alternative aspect of the invention, force feedback can be achieved at any point of the device by e.g. building up the pressure in the lines instead that in the displays. By closing all the inlet and outlet valves of the displays and the outlet valves 10*b* in the main manifold, the pumps will build up pressure in the pipes, rigidifying them. Relief and bypass valves can be used to keep a specific area of the pipe line under pressure while releasing pressure from the rest of the line, thus focusing the force feedback on that specific area.

7) In an additional or alternative aspect of the invention, the inlet valves 10*a* are solenoid valves driven with an adjustable pulse width modulation (PWM) frequency. The fast switching of the valve generates a vibration that moves along the pipe. If the display 3 is placed in vicinity of the valve, this vibration is transmitted to the membrane, thus creating vibration feedback under the skin. This fast switching frequency can be in the range of 220 Hz, the frequency at which the skin mechanoreceptors (FA) have the strongest response. When the vibration feedback is not required, the inlet valves can simply be used as ON/OFF valves. The control of the temperature in the display with the valves 10 does not require high frequency shifting, for example the hot medium inlet valve can stay open until the display medium heats up to the desired temperature and be closed afterwards.

8) In an additional or alternative aspect of the invention, a pinching force feedback is generated by connecting a third display cell interposed between two cells. This new middle cell, herewith named stiffness cell, can have the same design as previously described cells, with a main body and a membrane. Alternatively, it can have a main body with two membranes, one on top of the main body and the other on its bottom. It can also have only two membranes attached to each other, thus making a balloon. This chamber can be filled with the fluid medium and its stiffness, similarly to the stiffness feedback applied on the individual fingertips, can be changed by modifying the pressure of the medium inside the chamber. The stiffness of the cell, as well as the flexibility of its membranes, depends on the displacement required for the pinching movement and the forces required.

Having described in detail the haptic device and the VR/AR system, the multimodal system of the present invention further features a data processing apparatus 300 operatively connected with the VR/AR system 200, the apparatus 300 comprising a processor configured to perform the computer-implemented method of the invention. The data processing apparatus 300 can be of course, in some aspects according to the invention, be operatively connected with both the VR/AR system 200 and a haptic device 400, so to interconnect both elements between them and operate a multimodal system in a coherent fashion. The data processing apparatus or controller 300 can be any suitable device such as computers, servers, data processing machines, smartphones, tablets, voice-activated devices, (i.e. smart speakers/voice assistants) and the like.

In one aspect, the data processing apparatus 300 comprises memory storing software modules that provide functionality when the software modules, including computer-executable code, is executed by the processor. The modules can include an operating system that provides operating system functionality for the apparatus. The apparatus 300, in aspects where data are transmitted and/or received from remote sources, further includes a communication device, such as but not limited to a network interface card, wireless communication modules, RF communication devices, to provide mobile wireless communication, such as Bluetooth, infrared, radio, Wi-Fi, cellular network, or other next-generation wireless-data network communication. In other aspects, communication device provides a wired network connection, such as an Ethernet connection or a modem.

The modules can include modules to perform all the aspects of the method of the invention. In particular, the data processing apparatus 300 can operate the haptic device 400, the VR/AR system 200 and/or an audio system 500, as will be detailed hereinafter, so to perform a method including one or more of the following steps:

a) changing, via the AR/VR system, a user viewpoint from body-centered viewpoint to a distanced, such as an elevated, viewpoint;

b) showing to the user, via the AR/VR system, his/her own body from the distanced viewpoint and possibly his/her bodily movements in real-time;

c) providing haptic stimuli to the user, via the haptic device, configured to simulate the change in perspective from a body-centered viewpoint to a distanced viewpoint, or otherwise reinforce the illusion of at least one of an OBE exit state, an OBE disembodiment state and an OBE re-entry state;

d) changing, via the AR/VR system, the user viewpoint from a distanced viewpoint to a body-centered viewpoint;

e) providing, via the haptic device, haptic stimuli to the user configured to simulate the change in perspective from a distanced viewpoint to a body-centered viewpoint;

f) changing and/or showing a real, virtual or augmented environment to the user, including the user's own body;

g) aggregate all data of the VR/AR system (including a body scanning system) into a single high-resolution panoramic audiovisual computer format;

h) provide haptic stimuli by activating the haptic device according to a spatio-temporal pattern of haptic stimulation on a user's body;

i) provide haptic stimuli by activating the haptic device to change the temperature on a user's body;

j) provide auditory stimuli by activating an audio system according to an auditory spatio-temporal pattern;

k) provide auditory spatio-temporal pattern according to a spatio-temporal pattern of haptic stimulation, for instance by converting an audio signal into a haptic profile of stimulation, or vice-versa.

Additionally, in one aspect of the invention, the data processing apparatus 300 can comprise modules to automatically optimize the stimulation parameters to maximize the OBE in a subject. For instance, in operation, participants comfortably sit at the center of the body scanner 200 and wear a HMD 201. An initial set of stimuli parameters is identified by an adaptive machine learning algorithm, and the resulting multisensory combination (using the multimodal system of the invention) is presented to the participants. Their task will consist in focusing on the OBE, and eventually assess its quality by providing a subjective report. Next, the adaptive algorithm will propose new parameters with the goal of maximizing the report of the users or participants. The subjective report is assessed through the method of Magnitude Estimation, originally conceived to study the relationship between physical and perceived intensity of different sensory stimuli. A magnitude estimation task consists in asking participants to provide a numerical estimate that reflects the intensity of the perceived stimulus. When multiple stimuli are presented, participants provide new numbers based on the ratio between previous and current stimuli perceptions (e.g., the sensation of "leaving" or "exiting" the body, other OBE-related sensations, or a combination of several OBE-related sensations). For instance, if a new stimulus is perceived as being twice as strong, participants will provide a number that is twice as high. Magnitude estimates can be expressed verbally or by an input device (e.g., a joystick). Thus, the algorithm "learns" from the participant's responses and suggest the next best sensory combination (administered through the multisensory system) with the aim of maximizing the OBE or a specific aspect of the OBE, such as the subjective experience of leaving one's own physical body.

Alternatively, in one aspect of the invention, the OBE is automatically triggered (exit phenomena) when a certain physiological (e.g. heart rate or respiration), neural (as measured through EEG or fMRI), or subjective (i.e. assessed through questionnaires) parameter reaches a pre-defined or threshold level.

As anticipated, a multimodal system according to some aspects of the invention further comprises an audio system 500 configured to provide auditory stimuli to a user 100, wherein the data processing apparatus or system controller 300 is operatively connected with the audio system 500 and comprises one or more data processors that are configured to perform the method of the invention (FIG. 6). Spontaneous OBEs may include auditory sensations, ranging from simple humming sounds to more complex sounds with prominent spatial characteristics. The audio system 500 is operatively interconnected to the haptic device 400 and the AR/VR system 200 to induce auditory sensations similar to those reported during exit and re-entry phenomena.

The audio system 500 can include for instance one or more speakers. Additionally or alternatively, headphones or earphones can be used. The data processor of the computer may transmit an audio signal to speakers, which in turn outputs audio effects. Alternatively, earphones or headphones could be used. As a way of example, according to one aspect of the invention, the audio system 500 includes a plurality of loudspeakers, such as for instance eight (8) speakers, having a setting where the speakers are each located at the corners of an imaginary cube with a side length of two (2) meters centered around the head of the user 100. An apparent auditory motion illusion is then created by activating the loudspeakers according to spatio-temporal patterns similar to the ones used to generate the Tactile Apparent Movement Illusion, but tuned to the auditory perception.

Figure 7:
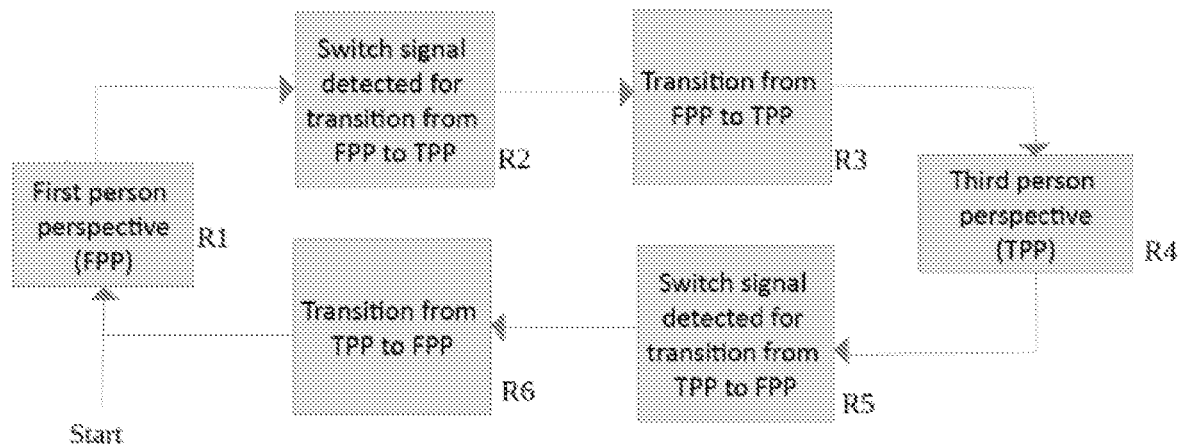
FIG. 7 shows a flowchart with the steps R1 to R6 of the method for creating an out-of-body experience to a user, according to another aspect of the present invention, that can be performed on the systems as shown in FIGS. 4-6.

FIG. 7 shows an exemplary flowchart with steps R1 to R6 for performing the method according to an aspect of the present invention. Different states are defined, including the first person perspective (FPP) and the third person perspective (TPP), and the steps of the method can detect signals that will trigger a change from the FPP to the TPP, and vice versa. For example, upon starting the method, a step R1 is performed, where the cloud points used for the 3D body reconstruction of the user 100 are displayed and updated from body scanning system BS in collaboration with HMD 201 and controller 300 and at each time the frame, the camera view positions for first person view point are determined, and via the HMD 201, a virtual 3D environment, that includes the 3D reconstructed body of user 100, is displayed to the user 100, as shown exemplarily in FIG. 8C. Also, the controller or computing device 300 checks for inputs from the user 100.

In step R2, an input from the user 100 has been detected, for example from a separate controller or by automatic detection of physiological or neural parameters of the user, and the transition from FPP to TPP is triggered. In this step R2, the HMD 201 in collaboration with controller 300 displays and update cloud points from body scanning system BS at each time frame, starts the tactile exit sensation with tactile feedback from haptic device 400, starts the audio exit sensation with audio system 500, and a camera position for the first person view point is presented, and the 3D environment with the HMD 201 is displayed.

In step R3, the transition from the FPP to the TPP is performed. In this step R3, in collaboration with HMD 201 and controller 300, the cloud points are displayed and updated from body scanning system BS in at each time frame, and evolution of tactile exit sensation is performed by haptic device 400, an evolution of audio exit sensation is performed by audio system 500 is performed, and the camera position starts changing from first person view point FPP to third person view point TPP following a predefined trajectory, speed and acceleration, and the virtual 3D environment is displayed by HMD 201.

In step R4, the third person perspective TPP is established and maintained. In this step, the cloud points are displayed and updated by body scanning system BS at each time frame, the tactile exit sensation is ended by haptic device 400, the audio exit sensation is ended by audio system 500, a camera position is set to the final TPP, and the virtual 3D environment is displayed by HMD 201. In addition, during step R4, the controller 300 checks for inputs from the user 100.

In step R5, as an example, upon detection of a triggering input by the user to transition from TPP to FPP, or based on an automatic trigger as describe above, the cloud points are displayed and updated by body scanning system BS at each time frame, a tactile re-entry sensation is performed by haptic device 400, an audio re-entry sensation is performed by audio system 500, a camera position is changed for third person view point TPP, and the virtual 3D environment is displayed by HMD 201. Next, in a step R6, the transition from TPP to FPP is performed. In this step, the cloud points body scanning system BS at each time frame are displayed and updated, an evolution of tactile re-entry sensation is performed by haptic device 400, an evolution of audio re-entry sensation is performed by audio system 500, and the camera position is changed from third person view point TPP to first person view point FPP following a predefined trajectory, speed and acceleration, and the virtual 3D environment is displayed by HMD 201.

The tactile exit or re-entry sensation that is performed by haptic device 400 can include, as an input data, the specifications in terms of frequency, amplitude and activation time of a vibration pattern, the specifications of the body location and dimensions where the vibration should be applied, and as an output to the user, a generation of vibrations on the body as a function of the distance between the current view point and the third person view point TPP (exit or re-entry sensations). The auditory exit or re-entry sensation that is performed by audio system 500 can include, as input data, an audio file, a volume setting, a spatial position of user 100 that can be measured by BS, and a duration of an audio sequence. As an output to the user 100, the audio system 500 produces the auditory component of exit and re-entry sensations, for example including spatialized audio click in synchrony with the tactile stimuli.

FIGS. 8A to 8D schematically and exemplarily shows the changes in view points to the user during the creation of the out-of-body experience. For example, in FIG. 8A, the user 100 is positioned to be surrounded by body scanning technology BS, for example a plurality of cameras, and wears a head mounted display HMD 201, and schematically the controller or computer 300 is shown. Next, in FIG. 8B, the first person viewpoint FPP of the user 100 on the real world is shown, without the display of the virtual 3D environment. The arrow on the human character that represents user 100 shows the direction of the view point. Next, in FIG. 8C, the first person viewpoint FPP of the user on the virtual world is shown. The 3D reconstruction of the part of the body of the user 100 that is visible in this view point is projected into the virtual reality scenario. Next, in FIG. 8D, the motion of the first person view point FPP to a TPP is represented, by the displacement of the human character that represents user 100, and the real existing position of user 100 is visualized on the left side of FIG. 8D, wearing the HMD 201.

The developed system and methods, thanks to a 3D dynamic body scanning integration in the VR/AR system, allow the rendering of the participants' digitalized body and its movements in a custom-made VR/AR environment. This combination allows for the immersive visual rendering of different elevated views of the participant's body, thereby reproducing the visual aspects and viewpoint changes that are classically reported by people with OBEs. The integration of the VR/AR system with haptic technologies and a dynamic audio system permits to include in the final setup other sensory aspects of OBE that have not been tested before in recent research using multisensory stimulation and VR. In particular, so-called exit and re-entry phenomena can be integrated into an induced OBE thanks to the system and methods of the present invention in a fully-controlled stimulation setting.

Advantageously, all or some, alone or in combination, of the sensory aspects of the visual scene provided to a user when an OBE is created, are integrated and also modified according to the exit, re-entry and disembodied state experienced by the user. The term "integrated" is herein used to mean that the way haptic, visual and/or auditory stimuli are administered to a user are coherent between them. More precisely, in an integrated system, the way a haptic stimulus is provided to a user is in coherence with the visual change of perspective experienced by the user; in the same way, sound cues are provided in an integrated system in coherence with the visual change of perspective. Furthermore, visual, auditory and haptic feedbacks and stimuli can be integrated between them in any suitable combination and depending on the needs and circumstances. As a non-limiting way of example, when in an OBE disembodiment state according to the method of the invention, sound cues happening on the visual scene will be reproduced as they are supposed to be perceived by a user from a distanced perspective, corresponding to the disembodiment state perspective.

In another aspect of the invention, the induction of the OBE is performed while the user is interacting with one or more people, whose movements are tracked, reconstructed and rendered through a body scanning technology and the head mounted display. In this context, multiple people might also have an induced OBE. In one of such scenario, two people wearing two head mounted displays and interacting in an environment tracked by the body scanning technology could undergo exit and re-entry sensations, "leaving" one's own body and re-entry on the other's person body (body swap).

In another aspect of the invention, vestibular stimulation is coupled with the described visual, tactile and auditory stimulation to strengthen the exit and re-entry sensations. The vestibular stimulation can be provided by galvanic stimulation or inertial stimulation through a robotic platform such as a Stewart platform, for example as described in U.S. Pat. Nos. 6,041,500 and 5,987,726, these references herewith incorporated by reference in their entirety. For instance, a user could be standing on a Steward platform and receive vestibular stimulation upwards during exiting phenomena and downwards during re-entry phenomena.

Many industrial applications can be envisaged for the systems and methods according to aspects of the present disclosure. The induction of an Out-of-Body Experience can be implemented as an additional feature in several video-related experiences in order to render them more realistic and vivid. For instance, one or more OBE states can be experienced, or could be experienced if desired, by a cinema audience, or by private users desiring to immerse themselves in a more intense way into a movie, 3D movie or a hologram-based video projection, as well as in live entertainment shows.

The induction of an OBE through the systems, devices, and methods according to some aspects of the present invention can be also implemented in videogames or virtual reality settings so that certain scenarios are enhanced and ameliorated. Videogame users could benefit from a method for inducing an OBE in order to have a more striking and powerful game experience. In virtual reality environments, including role games, escape games, or any other kind of simulation, the OBE could help in giving a stronger feeling of immersion within the environment. An OBE could also be part of a well-being practice (e.g. meditation, Yoga, massage), fitness practice (e.g. indoor biking) or educational activity (e.g. learning about out-of-body experiences), just to cite a few.

Turning on biomedical aspects, the systems and methods of the present invention can be useful for studying and deepening the understanding of the mechanisms behind the generation of the experience of "self" and "other", especially when this is distorted or altered in psychiatric or psychotic patients.

While the invention has been disclosed with reference to certain preferred embodiments, numerous modifications, alterations, and changes to the described embodiments, and equivalents thereof, are possible without departing from the sphere and scope of the invention. Accordingly, it is intended that the invention not be limited to the described embodiments, and be given the broadest reasonable interpretation in accordance with the language of the appended claims.

The invention claimed is:

1. A computer-implemented method for creating an Out of Body Experience (OBE) in a user by the use of an augmented/virtual reality (AR/VR) system, the OBE comprising an OBE exit state and an OBE disembodiment state, the method comprising the steps of:
   changing a user viewpoint from a body-centered viewpoint to distanced viewpoints to induce the OBE exit state; and
   showing to the user his/her own body as a three-dimensional real visual reconstruction from the distanced viewpoints to induce the OBE disembodiment state.

2. The method of claim 1, wherein the OBE further comprises an OBE re-entry state, the method further comprising the step of:
   changing the user viewpoint from a distanced viewpoint of the plurality of distanced viewpoints to a body centered viewpoint to induce the OBE re-entry state.

3. The method of claim 1, wherein changing and/or showing the user viewpoint comprises changing and/or showing a real, virtual or augmented environment to the user, including the user's own body as the three-dimensional real visual reconstruction.

4. The method of claim 1, further comprising:
   a step of providing haptic stimuli configured to provide tactile aspects of the OBE of at least one of the OBE exit state, the OBE disembodiment state, and an OBE re-entry state.

5. The method of claim 4, wherein the haptic stimuli are provided via a haptic device operatively connected with the AR/VR system.

6. The method of claim 4, wherein the haptic stimuli are provided by activating a haptic device according to a spatio-temporal pattern of a haptic stimulation on the user's body.

7. The method of claim 4, wherein the haptic stimuli include a temperature change.

8. The method of claim 1, further comprising:
   a step of providing the user with auditory stimuli.

9. The method of claim 8, wherein the auditory stimuli are provided via an audio system operatively interconnected to a haptic device and/or to the AR/VR system.

10. The method of claim 9, wherein the auditory stimuli are provided by activating the audio system according to an auditory spatio-temporal pattern.

11. The method of claim 10, wherein the auditory spatio-temporal pattern is provided according to a spatio-temporal pattern of haptic stimulation.

12. A system for creating an Out of Body Experience (OBE) to a user comprising:
   an AR/VR system configured to capture and show video information to the user about one of a movement or a position of the user; and
   a data processing apparatus operatively connected with the AR/VR system, the data processing apparatus comprising a processor configured to instruct the AR/VR system to a change a user viewpoint from a body-centered viewpoint to distanced viewpoints to induce an OBE exit state, and instruct the AR/VR system to show the user his/her own body as a three-dimensional real visual reconstruction from the distanced viewpoints to induce an OBE disembodiment state.

13. The system of claim 12, further comprising:

a haptic device configured to provide haptic stimuli to the user, wherein the data processing apparatus is operatively connected with the haptic device.

14. The system of claim 12, further comprising:

an audio system configured to provide auditory stimuli to the user, wherein the data processing apparatus is operatively connected with the audio system.

15. The system of claim 12, wherein the AR/VR system includes a body scanning system for scanning the body of the user to provide for imaging data for the three-dimensional real visual reconstruction of the user.

16. The system of claim 15, wherein the body scanning system comprises a plurality of cameras configured to perform live recording of the body of the user.

17. The system of claim 13, wherein the haptic device includes a device for providing a kinesthetic haptic stimulus.

18. The system of claim 13, wherein the haptic device includes a plurality of tactile displays.

19. The system of claim 18, wherein the tactile displays are pneumatically or hydraulically operated.

20. The system of claim 18, wherein the tactile displays are configured to provide at least one of a force, a pressure, a vibration and/or a temperature change haptic stimulus.

21. The method of claim 1, wherein the step of changing the user viewpoint from body-centered viewpoint to the distanced viewpoints is performed such that a virtual camera providing for the viewpoint moves gradually away from the three-dimensional real visual reconstruction of his/her own body along a trajectory.

22. The system of claim 12, wherein the change of the user viewpoint from body-centered viewpoint to the distanced viewpoints is performed such that a virtual camera providing for the viewpoint moves gradually away from the three-dimensional real visual reconstruction of his/her own body along a trajectory.

23. The method of claim 1, further comprising the step of:

scanning the body of the user with a body scanning system to provide for imaging data for the three-dimensional real visual reconstruction of the user.

24. The method of claim 23, wherein the body scanning system includes a plurality of cameras configured to perform live recording of the body of the user.

* * * * *